Patented July 5, 1938

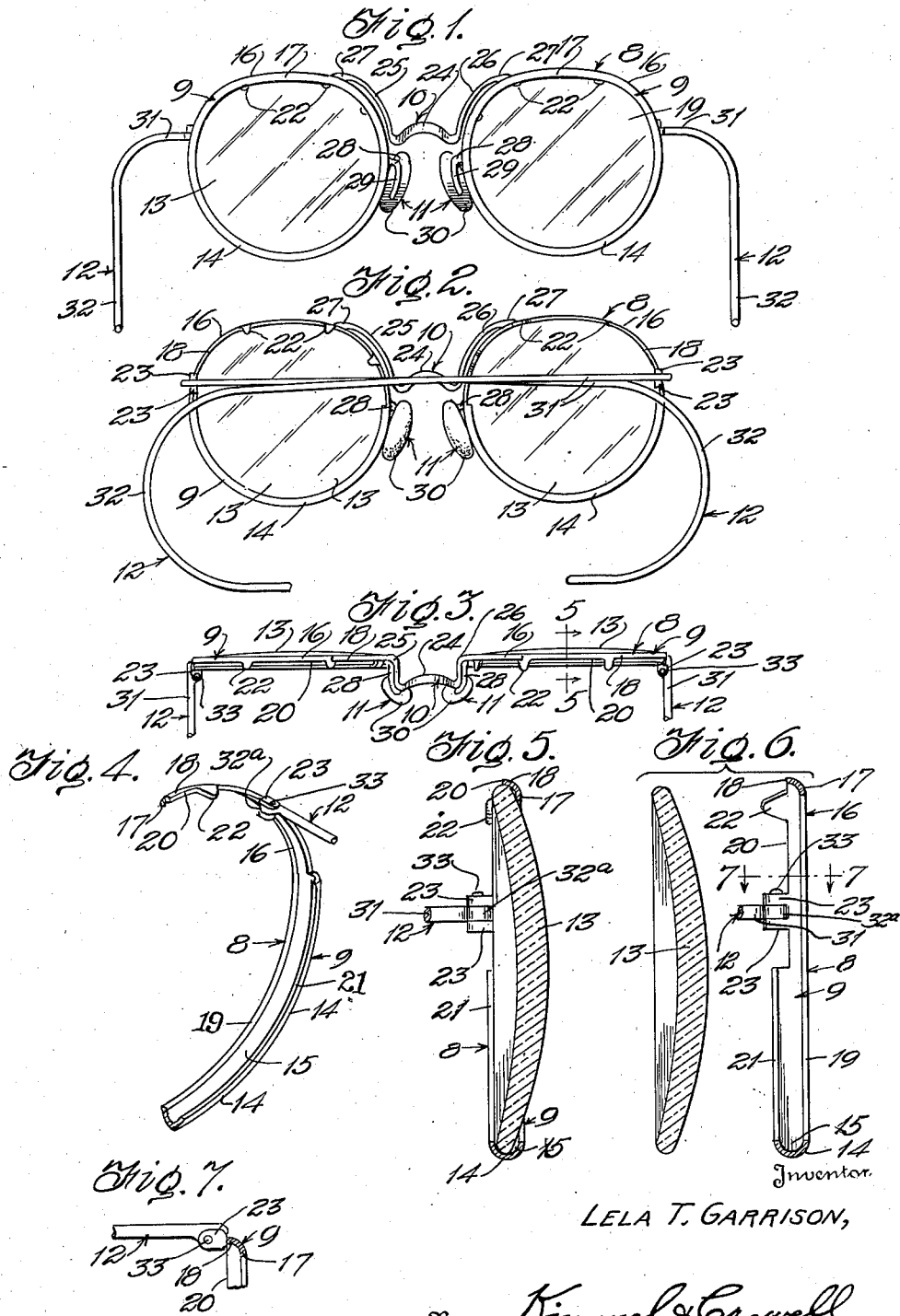

2,123,104

UNITED STATES PATENT OFFICE 2,123,104

FRAME FOR SPECTACLES

Lela T. Garrison, Cape May Court House, N. J.

Application April 14, 1937, Serial No. 136,939

2 Claims. (Cl. 88—47)

This invention relates to spectacles, more particularly to the frame thereof.

The invention has for one of its objects to provide a non-split metallic rim with spaced inherent means for securely anchoring a lens therein.

The invention has for a further object to provide, in a manner as hereinafter set forth, a frame for spectacles including metallic non-split lens holding rims having means for securely retaining the lenses within the rims to prevent any possibility of the lenses becoming dislodged from the rims when the spectacles are worn, stored or handled.

A further object of the invention is to provide, in a manner as hereinafter set forth, a lens rim including upper and lower retaining means for a lens acting to prevent the dislodgement of the lens when the edge of the latter is encompassed by the rim.

A further object of the invention is to provide, in a manner as hereinafter set forth, a lens holding rim including an upper and a lower portion, said portions being flush at their fronts, said upper portion having its rear edge inset with respect to the rear edge of said lower portion, and attaching lugs for a temple extended rearwardly from the rear edge of the upper portion and at right angles to the plane of the rim.

Further objects of the invention are to provide, in a manner as hereinafter set forth, a frame for spectacles which is simple in its construction and arrangement, strong, durable, compact, readily assembled, thoroughly efficient for the purpose for which it is designed, pleasing in appearance, and comparatively inexpensive to manufacture.

To the above ends essentially and to others which may hereinafter appear, the invention consists of the novel construction, combination and arrangement of parts as will be more specifically described and as illustrated in the accompanying drawing wherein is shown an embodiment of the invention, but it is to be understood that changes, variations and modifications may be resorted to which fall within the scope of the invention as claimed.

In the drawing:

Figure 1 is a front elevation of a pair of spectacles with the temples extended and having as an element thereof the frame in accordance with this invention, Figure 2 is a rear elevation of a pair of spectacles with the temples in non-extended position and having as element thereof the frame in accordance with this invention, Figure 3 is a top plan view of the structure shown in Figure 1, Figure 4 is a fragmentary view in perspective of and looking towards the inner face of a rim of the frame in accordance with this invention, Figure 5 is a section on line 5—5, Figure 3, Figure 6 is an exploded view of the structure shown in Figure 5, and Figure 7 is a section on line 7—7, Figure 6.

The frame generally indicated at 8 includes a pair of lens holding rims 9 of like form, a bridge 10 coupling the rims in spaced relation, a pair of oppositely disposed nose-pad carrying arms 11 and a pair of temples 12 of like form foldable relative to the rims 9.

The shape of the rims 9 is not limited to the contour shown, as they are to be of a contour corresponding to that of the lenses 13 secured therein. The rims are to be constructed of any desirable metallic material and of the non-split type. Each rim includes a lower portion 14 of inwardly opening channel-shaped cross sections, or in other words, the inner face of portion 14 is grooved lengthwise from end to end thereof as at 15. Preferably the length of portion 14 will correspond to half the length of the rim. Each end of groove 15 is open. Each rim also includes an upper portion 16 of less width than that of portion 14. The body of portion 16 is of such contour in transverse cross section to form what may be termed a front and a rear leg or flange 17, 18 respectively. The leg 17 is disposed at an angle to leg 18 and forms a flush continuation of the front part 19 of portion 14. The rear edge 20 of portion 16 is arranged forwardly of the rear part 21 of portion 14, that is to say, edge 20 and part 21 are set up in offset relation with respect to each other. Formed integral with the rear edge 20 of the portion 16 is a plurality of spaced bendable securing barbs 22. The rear edge 20 of the portion 16, on the temple side of the rim and between the horizontal median and top of the rim is provided with a pair of spaced superposed apertured lugs 23 for a purpose to be referred to. The lugs 23 extend rearwardly at right angles to the horizontal median of the rim. The groove 15 and the barbs 22 coact for a purpose to be referred to.

The bridge 10 depends between the rims 9 to a point in close proximity to the arms 11. The bridge 12 is formed of an arch-shaped bar 24 for seating on the nose and a pair of oppositely outwardly curved upstanding hanger arms 25, 26 arranged for the major portion of their length in close proximity to the nasal sides of the portion 16 of the rims. The arms 25, 26 at their lower ends merge into the ends of the bar 24. The arms 25, 26 are of a length to extend on the inner ends of the tops of the rims. The upper ends 27 of the arms 25, 26 merge into the inner ends of the outer edges of the tops of the portions 16 of the rims. The bridge 10 is of flared contour open at its top and closed at its bottom.

Each of the arms 11 is substantially of L-shape contour and is formed of an upper rearwardly extending inwardly inclined front part 28 and a depending outwardly curved rear part 29 anchored to and lengthwise of the outer side of nosepad 30.

Each temple 12 includes a rearwardly extending stretch 31 and a curved stretch 32 depending from the rear end of the stretch 31. The latter on its inner side edge and in proximity to its forward end is formed with an integral apertured ear 32ª which is positioned between and hinged to a pair of lugs 23 by a pivot 33. When a temple is extended that part of stretch 31 extending outwardly beyond the ear 32a abuts the the outer edge of the temple side of the rim portion 16 and arrests the extending of the temple as shown in Figure 3. The manner of setting up the temples relative to the rims permits of the temples folding to the position shown in Figure 2.

The rims 9 are shown as having mounted therein the lenses 13 and these latter are securely anchored by the coaction of the grooves 15 and barbs 22. When mounting a lens relative to a rim, the edge of its lower portion is seated in the groove 15 of rim portion 14, the edge of the upper portion of the lens is seated in rim portion 16, after which the barbs 22 are bent against the upper part of the rear face of the lens and the barbs will coact with the groove 15 and the leg 17 of rim portion 16 to securely anchor the lens to the rim. The manner of anchoring the lens prevents it from falling out of the rim when the spectacles are used or handled in any manner.

What I claim is:

1. In spectacles, an endless lens holding rim formed of a strap-like lower portion and a strap-like upper portion reversely disposed with respect to and merging into said lower portion, said lower portion including a bottom part, a front part, a rear part having upper end edges and a pair of side parts, each having an upper end edge, said lower portion being formed throughout its inner face with a groove opening at each of its ends for receiving a portion of the edge of the lens, said upper portion for receiving the forward part of the remaining portion of the edge of the lens, said upper portion being formed of front and rear legs disposed in angular relation, said front leg merging into said front part and forming a flush continuation thereof, said rear leg being of a cross sectional length less than the length of the upper end edges of said side parts and merging into the forward portions of the said upper end edges of the side parts, the inner lengthwise edge of said rear leg being disposed forwardly with respect to the upper end edges of said rear part, and inwardly extending bendable barbs integral with said lengthwise edge and adapted when bent to overlap and engage the rear face of the lens to detachably secure the latter in and to the rim.

2. In spectacles, an endless lens holding rim formed of a strap-like lower portion and a strap-like upper portion reversely disposed with respect to and merging into said lower portion, said lower portion being so formed for receiving therein an edge portion of the lens and for overlapping parts of the marginal portions of the faces of the lens bordering said edge portion, said upper portion being so formed for receiving the forward part of the remaining portion of the edge of the lens and for overlapping the remaining part of the marginal portion of the outer face of the lens bordering said edge, the rear side of said upper portion being of less width with respect to the rear side of said lower portion, and spaced inwardly extending bendable barbs on the rear side of said upper portion for overlapping spaced parts of said remaining portion of the lens edge and for abutting spaced parts of the marginal portion of the rear face of the lens bordering said edge to detachably secure the lens to the rim.

LELA T. GARRISON.